United States Patent [19]

Jones

[11] Patent Number: 4,990,378
[45] Date of Patent: Feb. 5, 1991

[54] HOT MELT WAX COATINGS FOR FIBROUS SUBSTRATES

[75] Inventor: Richard L. Jones, Ponca City, Okla.

[73] Assignee: Conoco Inc., Ponca City, Okla.

[21] Appl. No.: 307,875

[22] Filed: Feb. 6, 1989

[51] Int. Cl.$^5$ .............................................. B32B 7/04
[52] U.S. Cl. .................................... 427/420; 427/443
[58] Field of Search ............... 427/420, 443; 106/270; 524/471

[56] References Cited

U.S. PATENT DOCUMENTS

| 3,175,986 | 3/1965 | Aplkos et al. | |
| 3,243,396 | 3/1966 | Hammer. | |
| 3,297,610 | 1/1967 | Moyer. | |
| 3,364,055 | 1/1968 | Nelson. | |
| 3,440,194 | 4/1969 | Taranto. | |
| 3,496,062 | 2/1970 | MacLeod. | |
| 3,522,081 | 7/1970 | Moyer. | |
| 3,923,711 | 12/1975 | Pullen. | |
| 3,962,509 | 6/1976 | Thompson | 427/391 |
| 4,224,204 | 9/1980 | Nichols et al. | 524/471 |
| 4,377,649 | 3/1983 | Sweeney et al. | 156/328 |

Primary Examiner—Stanley Silverman
Attorney, Agent, or Firm—Cleveland R. Williams

[57] ABSTRACT

A process for coating a fibrous substrate with a hot melt wax composition is disclosed. The coating compositions comprise a mix of a fully refined paraffin wax, a petroleum wax selected from the group consisting of a recrystallized heavy intermediate wax and a microcrystalline wax and mixture thereof, a polymeric hydrocarbon compound, a tackifier resin optionally but preferred, a phenolic anti-oxidant.

26 Claims, No Drawings

HOT MELT WAX COATINGS FOR FIBROUS SUBSTRATES

BACKGROUND OF THE INVENTION

1. Field of the Invention

The present invention relates to improved wax compositions and fibrous substrates coated therewith, and more particularly to compositions of a fully refined paraffinic petroleum wax, a recrystallized heavy intermediate petroleum wax, a microcrystalline petroleum wax and polymeric hydrocarbon compounds. In addition, the wax compositions contain a tackifier resin and a phenolic anti-oxidant. These wax compositions are particularly suitable for coating fibrous substrates. The copending application of Richard L. Jones entitled "Hot Melt Wax Compositions", Ser. No. 07/307,655, filed Feb. 6, 1990, describes hot melt wax compositions and a process for producing the same, the disclosure of which is incorporated herein by reference.

It is known to coat fibrous substrates, for example, paper and the like with wax and wax like compositions. These coatings are particularly useful in preventing the migration of moisture either out of or into a container treated therewith. Numerous waxes have been used as coatings for fibrous substrates in the past, including animal and vegetable waxes, for example, bees wax, wool wax, cotton wax and the like.

The mineral waxes, in particular, the petroleum waxes such as paraffin wax, microcrystalline wax and the like are more commonly used at the present time to coat fibrous substrates. Blends of these waxes have additionally been used in the past. These wax coatings, however, generally exhibit one or more deficiencies, such as, lack of sufficient hardness, scuff resistance, tensile strength, resistance to cracking, an opaque color and other undesirable characteristics. In the absence of microcrystalline waxes, distillate paraffin waxes are usually too brittle to be effective as coating waxes, particularly at ambient temperatures such as room temperature and below. To overcome these and other difficulties it has become common practice to use blends of certain additives in wax compositions. The use of polymers as additives in waxes has greatly improved certain characteristics in wax coatings, however, many wax coatings which use these additives still suffer from one or more disadvantage such as an opaque color, poor resistance to moisture, as well as insufficient heat and thermal stability, grease resistance and gloss stability. The wax compositions herein overcome these difficulties and, in addition, when applied as a coating to fibrous substrates are substantially clear in color. This is important because it allows for writing and marks on the fibrous substrate to be visible to the eye after the coating is applied.

2. Description of the Prior Art

Wax compositions, paper products containing coatings of wax compositions and processes for making and Producing the same are known and are currently practiced commercially. For example, U.S. Pat. No. 3,175,986 issued Mar. 30, 1965 relates to paraffin wax-containing compositions suitable for coating and laminating paper board, carton board and the like. The wax compositions consist of a paraffin wax, an ethylene-vinyl acetate copolymer, a microcrystalline wax and a terpene resin.

U.S. Pat. No. 3,243,396 issued Mar. 29, 1966 discloses a plastic formulation suitable for coating paper, cardboard, etc. The plastic formulations consist of paraffin wax, microcrystalline wax, ceresin wax, a solid polyethylene resin, and an isotactic polyterpene.

U. S. Pat. No. 3,297,610 issued Jan. 10, 1967 relates to wax compositions which are described as especially useful as coatings for paper or other packaging materials. The wax composition consists of a blend of a paraffinic petroleum wax, an isoparaffinic petroleum wax, and two different microcrystalline petroleum waxes.

U.S. Pat. No. 3,364,055 issued Jan. 16, 1968 discloses a method of applying a hot melt adhesive to a carton blank. The method includes the steps of feeding carton blanks in spaced relation beneath adhesive applying nozzles which emit a continuous stream of hot melt adhesive, and catching the emitted adhesive in a receptacle beneath the nozzle during the time that the spaced cartons are not beneath this nozzle.

U.S. Pat. No. 3,496,062 issued Feb. 17, 1970 discloses a laminate of paper and a polyethylene film sealed together with a wax composition consisting of a paraffin wax and a microcrystalline wax mixed with a copolymer of ethylene and vinyl acetate.

U.S. Pat. No. 3,522,081 issued July 28, 1970 relates to a process for preparing a coated fibrous material consisting of applying to one side of a fibrous rollable sheet material a film of a molten composition consisting of a paraffin wax, an ethylene-vinyl acetate copolymer, and alternatively an amophous resin.

U.S. Pat. No. 3,923,711 issued Dec. 2, 1975 discloses wax coating compositions prepared by subjecting a molten blend of petroleum wax and an ethylene-vinyl acetate copolymer to controlled oxidation. The controlled oxidation can take place in the presence of an oxidation inhibitor, for example, a hindered phenol.

It must be noted, however, that the wax compositions comprising a fully refined paraffin wax, a microcrystalline wax and a polymeric hydrocarbon compound and-/or in combination with a tackifier resin and phenolic anti-oxidant claimed herein are new and unappreciated by the prior art.

SUMMARY OF THE INVENTION

This invention encompasses new wax compositions that are particularly suitable for use as coating compositions for fibrous substrates. In particular, the invention relates to a wax composition which comprises a paraffin wax and a petroleum wax selected from the group consisting of a recrystallized heavy intermediate wax and a microcrystalline wax and mixtures thereof, a polymeric hydrocarbon compound, a hydrocarbon resin and optionally a petroleum-wax soluble phenolic anti-oxidant.

More specifically, the invention comprises (a) from about 10 weight percent to about 80 weight percent of a fully refined paraffin petroleum wax having a melting point range of from about 120° F. to about 160° F., (b) from about 1 to about 80 weight percent of a recrystallized heavy intermediate wax having a melting point range of from about 145° F. to about 185° F., (c) from about 1 weight percent to about 50 weight percent of a microcrystalline petroleum wax having a melting point of from about 150° F. to about 200° F.; and (d) from about 10 weight percent to about 30 weight percent of a polymeric hydrocarbon compound having a molecular weight of from about 2,000 to about 100,000 and a melt index of from about 1 to about 250° at 375° F. In addition, the wax compositions contain (e) from about 0.01 weight percent to about 10 weight percent of a hydrocarbon resin derived from a $C_5$ olefin petroleum feed stock or polyterpene resin, and (f) from about 0.01 weight percent to about 0.2 weight percent of a petroleum-wax soluble, phenolic anti-oxidant.

DETAILED DESCRIPTION OF THE INVENTION

The present invention relates to wax compositions, which comprise a fully refined paraffinic petroleum wax, a petroleum wax selected from the group consisting of a recrystallized heavy intermediate wax and a microcrystalline petroleum wax and mixtures thereof, a polymeric hydrocarbon compound and optionally and preferably a hydrocarbon resin derived from a $C_5$ olefin petroleum feed stock or terpene resin and a phenolic anti-oxidant. These wax compositions are particularly suitable for use as wax coatings for fibrous substrates.

The waxes of the present invention are derived commercially from petroleum stocks. The petroleum industry generally classifies petroleum waxes in three main categories, namely (1) paraffins, (2) intermediate, and (3) microcrystallines. Other classes of waxes include the scale waxes and slack waxes. This invention is concerned with novel and upgraded fully refined paraffin waxes, recrystallized heavy intermediate waxes and microcrystalline waxes which exhibit excellent color and coating qualities when formulated to coat fibrous substrates.

Generally, in a commercial petroleum process the paraffin waxes comprise the 90, 200 and 350 distillate fractions from a vacuum distillation unit. These numbers represent Saybolt universal seconds, a measure of the distillate viscosity at 100° F. This wax is a mixture of solid hydrocarbons derived from the overhead wax distillate fraction obtained from the fractional distillation of petroleum crude oils. The paraffin wax, after purification, is a substantially colorless, brittle and low viscosity material normally having a melting point of from about 120° F. to about 160° F.

The paraffinic petroleum waxes suitable for use in the present invention preferably have melting points in the range of from about 120° F. to about 150° F., most preferably from about 140° F. to about 145° F. These waxes are produced from the 90 to 350 distillate fractions of a vacuum distillation unit (Saybolt Universal seconds) at 100° F. It is to be noted that the optimum distillation temperature and pressures for the paraffinic petroleum waxes herein will vary according to the crude oil source.

The heavy intermediate waxes of the current invention are produced from the 650 distillate wax fraction of a vacuum distillation unit, e.g., Saybolt Universal seconds at 100° F. The temperature and pressure of the vacuum residue are optionally adjusted to distill off the 650 distillate wax fraction in the process herein. It should be noted that petroleum crude oils from different sources will have different optimum temperatures for distilling off the 650 distillate wax fraction. These heavy intermediate waxes have a melting point range of from about 145° F. to about 185° F., preferably from about 155° F., to about 170° F., and exhibit somewhat different physical properties than the individual paraffin waxes and microcrystalline waxes.

Microcrystalline waxes are conveniently produced from the nondistillable vacuum tower residues or resids from the fractional distillation of petroleum crude oils. These waxes differ from paraffin waxes in having branched hydrocarbons of higher molecular weight. They are considered more plastic than paraffin waxes, normally are dark colored or opaque, and usually have a melting point of from about 150° F. to about 200° F., preferably from about 170° F. to about 190° F. Generally, most wax coating compositions in the past have preferably used a mixture of paraffin wax and microcrystalline wax in combination with one or more additives to obtain certain desirable properties.

After the vacuum distillation step, the distillates are conveniently purified using a conventional extraction process, for example, a furfural and/or duosol solvent extraction process which are well known in the petroleum industry. The purified raffinates are dissolved in process solvents and chilled to precipitate the wax component. This process is referred to in this industry as dewaxing. The wax fraction so produced is substantially more solid and contains less of the oily components.

Next, this dewaxed paraffin, heavy intermediate and microcrystalline crude waxes are separately dissolved and crystallized from a two solvent system, for example, a methyl ethyl ketone/toluene mixed solvent. The mixed solvent is normally mixed in a weight ratio of from about 70:30 to about 45:55 of methyl ethyl ketone to toluene respectively. The mixed solvent normally will be heated to a temperature above the congealing point of the paraffin, heavy intermediate or microcrystalline wax which is approximately 158° F. or higher. Preferably, the mixed solvent is heated to a temperature of from about 170° F. to about 250° F. It should be noted that higher temperatures can be used, but are not deemed necessary. The paraffin wax, heavy intermediate wax or microcrystalline wax are separately contacted with an excess of the mixed solvent, preferably at a weight ratio of from about 1:1 to about 1 to 6 of paraffin wax, heavy intermediate wax or microcrystalline wax to mixed solvent. The resulting mixture is than cooled to a temperature which allows the paraffin wax, heavy intermediate or microcrystalline wax to separately crystallize from the mixed solvent system. Normally a temperature of from about 80° F. to about 180° F. will be sufficient to crystallize the respective waxes. It should be noted that some waxes may require a lower temperature to efficiently initiate the crystallization process.

After the paraffin wax, heavy intermediate wax and/or microcrystalline are recovered, they are separately redissolved and recrystallized from the above-described two solvent system using substantially the same procedure, including temperatures and weight ratios of solvent and/or wax.

Finally, the fully refined paraffin wax, recrystallized heavy intermediate wax and/or fully refined microcrystalline wax are separately percolated in the molten state through a clay bed utilizing a gravity flow system. In order to maintain the respective waxes in the molten state, a temperature range of from about 200° F. to about 300° F. is used for the wax and the clay bed. Normally, the clay bed and respective wax are contacted on a 1:1 weight ratio, especially from about 5 weight percent to about 60 weight percent of wax per weight percent of clay. Suitable clays include bauxite, fullers earth and silica gel, especially bauxite.

The wax compositions herein comprise from about 1 weight percent to about 80 weight percent, preferably from about 30 weight present to about 60 weight percent of a paraffin wax and from about 1 weight percent to about 80 weight percent, preferably from about 10 weight percent to about 30 weight percent of a petroleum wax selected from the group consisting of a recrystallized heavy intermediate wax and a microcrystalline wax and mixtures thereof, a polymeric hydrocarbon compound, a hydrocarbon resin and optionally a petroleum wax soluble phenolic anti-oxidant.

More particularly, the invention comprises (a) from about 1 weight percent to about 80 weight percent, preferably from about 30 weight percent to about 60 weight percent, of a fully refined paraffin petroleum wax having a melting point of from about 120° F. to about 160° F., especially from about 120° F. to about 150° F., most preferably from about 140° F. to about 145° F., (b) from about 1 weight percent to about 80 weight percent, preferably from about 10 weight percent to about 30 weight percent of a recrystallized heavy intermediate wax having a melting point of from about 145° F. to about 185° F., preferably from about 155° F. to about 170° F., (c) from about 1 weight percent to about 50 weight percent, preferably from about 1 weight percent to about 25 weight percent of a microcrystalline petroleum wax having a melting point of from about 150° F. to about 200° F., preferably from about 170° F. to about 190° F., and (d) from about 10 weight percent to about 30 weight percent of a polymeric hydrocarbon having a molecular weight of from about 2,000 to about 100,000 and a melt index of from about 1 to about 250° at 375° F. The polymeric compound suitable for use herein is a member selected from the group consisting of ethylene-vinyl acetate copolymer, ethylene-ethyl acrylate copolymer and polypropylene and mixtures thereof. The preferred polymeric compound is ethylene-vinyl acetate copolymer.

The copolymers of ethylene-vinyl acetate herein are characterized by a 15 weight percent to about 30 weight percent functional vinyl acetate content. Particularly preferred ethylene-vinyl acetate copolymers suitable for use are the copolymers manufactured and sold commercially by the E. I. DuPont de Nemours and Company under the trade name Elvax ® resins. The Elvax ® resins having grades of from 220 to 460 are especially preferred for use as the polymeric hydrocarbon compound.

The ethylene-ethyl acrylate copolymers herein are characterized by a 20 weight percent to about 30 weight percent functional ethyl acrylate content. Typical of these compounds are the ethylene-ethyl acrylate copolymers marketed commercially by the Dow Chemical Company under the trade name EA 2018 ® and EA 3018 ®.

The polypropylene polymers of this invention are normally solid polymers preferably having an average molecular weight of from about 1,000 to about 20,000. Typically, polypropylene has a melt point between 280° F. and 335° F., and a specific gravity between about 0.90 and 0.92.

The wax compositions of this invention can also contain (e) from about 0.01 weight percent to about 10 weight percent preferably from about 0.01 weight percent to about 8 weight percent of a hydrocarbon resin derived from a $C_5$ olefin petroleum feed stock or polyterpene resin and (f) from about 0.01 weight percent to about 0.2 weight percent, preferably from about 0.01 weight percent to about 0.1 weight percent of a petroleum-wax soluble, phenolic anti-oxidant.

The hydrocarbon resins derived from a $C_5$ olefin petroleum feed stock or polyterpene resins herein are tackifying agents which improve the adhesion and flexibility of the wax compositions. Suitable hydrocarbon resins derived from a $C_5$ olefin petroleum feed stock are marketed commercially by the Exxon Chemical Company under the trade name Escorez ® tackifying resins. A particularly preferred tackifier for use herein is Escorez 1504 ®.

Other hydrocarbon resins suitable for use include the polyterpene resins. The polyterpene resins which are suitable for use are those having melting points of from about 215° F. to about 275° F. These resins are conveniently produced by catalytically polymerizing pinenes. Suitable polyterpene resins produced by the polymerization of pinenes are sold commercially by the Arizona Chemical Company under the trade name Zonarez ® and by the Neville Chemical Company under the trade name Nevtac ®, especially Nevtac 100 ®.

The final component in the wax compositions herein is (g) a petroleum-wax soluble, phenolic anti-oxidant. The ditert-butyl paracresols are particularly suitable for use herein. These compounds concomitantly provide protection against oxidation and increase the tensile strength of the wax compositions herein. A particularly suitable compound is 2,6,ditert-butyl paracresol marketed as Tenox BHT ® by the Eastman Chemical Company.

The wax compositions of the present invention are particularly suitable for use as coating materials for fibrous substrates and the like. Fibrous substrates which are suitable for use as supports for the coating compositions include paper, paper board, paper cartons, paper cups, corrugated box board and the like.

The process of hot melt coating as employed in this invention includes any process in which the wax composition is heated or otherwise formed into a molten, viscous, mass and applied as a coating to a fibrous substrate or article and allowed to congeal on the substrate. Thus the wax composition can be sprayed on the fibrous substrate, applied to a roller which in turn applies the molten wax composition to a substrate, or alternatively the substrate can be dipped into the molten wax. The preferred process, however, is the curtain coating process in which a molten wax flows from a narrow, slit-like orifice and is permitted to fall vertically in the form of a molten, viscous curtain onto the surface of a fibrous substrate.

In conventional curtain coating apparatus now in use, such as the Ashdee curtain coating machine, the basic elements of the machine typically comprise a coating head from which a thin film of wax gravitates in the form of a curtain onto a moving conveyor belt containing a fibrous substrate to be coated. A receptacle or container to receives the coating wax is located below the coating head to receive excess wax from the coating step. In a typical operation of a typical coating machine, the coating wax is allowed to gravitate from the coating head, or is ejected therefrom under a slight pressure and falls through the air as a curtain or thin film of molten wax. The excess liquid wax composition is received by the container or receiver trough below the coating head and is recirculated from the receiving trough to the coating head after passing through suitable heating and degassing equipment. Normally the molten wax is heated to a temperature of from about 220° F. to about 320° F.

The following examples serve to demonstrate the best mode of how to practice the invention herein and should not be construed as a limitation thereof.

EXAMPLES I TO IV

Three different waxes were obtained from the Cit-Con Company's refinery in Lake Charles, La. for testing and comparison. The Cit-Con Company is a joint venture between the Cit-Con Corporation and Conoco Inc., a subsidiary of the E. I. Du Pont de Nemours and Company. The three waxes tested were paraffin 350 wax, a recrystallized heavy intermediate 650 wax (HI wax), and a microcrystalline wax obtained from the residue (resid) of an atmospheric distillation unit.

The three waxes had the following properties:

TABLE 1

| Property | Paraffin 350 (Ex. I) | Microcrystalline (Ex. II) | HI (Ex. III) |
| --- | --- | --- | --- |
| Oil Content, Wt. % | 0.5 | — | 1.0 |
| Congealing Point, °F. | 146 | 170.0 | 160.0 |
| Melting Point, °F. | 153 | 178.0 | 162.0 |
| Kinematic Viscosity, CST 212° F. | 5.0 | 18.1 | 7.3 |
| Needle Penetration, Dmm, °F. | 12.0 | 17.0 | 17.0 |
| Refractive Index, 176° F. | 1.4335 | 1.4515 | 1.4385 |
| Molecular Weight, MW | 450.0 | 733.0 | 533.0 |
| Normal Alkane Content, Wt % | 90.0 | — | 73.0 |

The above-identified waxes were tested for the properties listed in Table 2 below without the benefit of additives.

TABLE 2

| Test Conducted | Paraffin Wax (Ex. IV) | Microcrystalline Wax (Ex. V) | HI Wax (Ex. VI) |
| --- | --- | --- | --- |
| Color, ASTM-D1500 | 0.0 | 4.5 | 0.5 |
| Viscosity, CST ASTM-D445, 210° F. | 4.5 | 16.4 | 7.3 |
| Heat of Fusion BTU/Lb, by Differential Scanning Calorimetry ASTM-D4419 | 91 | 72 | 83 |
| Boiling Pt., °F. ASTM-D1160 at 5 Liquid Vol. Dist. | 809 | 971 | 873 |
| Total Normal Alkane Content, Wt. by Gas Chromatography | 90 | 54 | 73 |

As can readily be determined from the above, there is a distinct difference between the various properties of the three waxes.

EXAMPLES VII TO XI

Physical performance tests were conducted on blends of the three waxes from Examples I to III and polymer additives to determine the properties of the wax compositions. The wax compositions, tests and results are set forth in Table 3 below:

TABLE 3

| Composition, Wt. % | Ex. VII | Ex. VIII | Ex. IX | Ex. X | Ex. XI |
| --- | --- | --- | --- | --- | --- |
| Paraffin 350 Wax | 79.0 | 0.0 | 0.0 | 39.5 | 26.33 |
| Microcrystalline Wax | 0.0 | 79.0 | 0.0 | 39.5 | 26.33 |
| HI Wax | 0.0 | 0.0 | 79.0 | 0.0 | 26.33 |
| EVA Co-polymer[(1)] | 16.0 | 16.0 | 16.0 | 16.0 | 16.0 |
| Petroleum Hydrocarbon Resin[(2)] | 5.0 | 5.0 | 5.0 | 5.0 | 5.0 |
| Property Tested | | | | | |
| Color, ASTM-D1500 | 0.5 | 3.0 | 1.0 | 2.0 | 2.0 |
| Viscosity, CP ASTM-D2669 | 306 | 667 | 427 | 456 | 442 |
| Needle Penetration 1/10 mm, ASTM-D1321 77° F. | 7 | 12 | 9 | 7 | 7 |
| Dropping Point, °F. ASTM-D3461 | 157 | 191 | 166 | 175 | 172 |
| Tensile Strength Lbs/sq. in. ASTM-D638 77° F. | 450 | 275 | 352 | 450 | 426 |
| Ductility, % Elongation ASTM-D638, 77° F. | 11 | 24 | 25 | 36 | 30 |

[(1)]EVA Copolymer - ethylene vinyl acetate copolymer with a 28 weight percent vinyl acetate content, a 6.0 melt index and a 212° F. soft point.
[(2)]Petroleum Hydrocarbon Resin - Escorez 1504 ®, a tackifying resin marketed by the Exxon Chemical Company.

The above data prove that the wax blends of Examples X and XI have comparable tensile strength and needle penetration properties when compared to Example VII which only contains this paraffin wax in the blend; but exhibit superior tensile strength and needle penetration properties when compared to Examples VIII and IX which only contain the microcrystalline and HI waxes respectively in the blends. The ductility, % elongation of the blends of Examples X and XI, which are a mixture of waxes, exhibit superior properties when compared to the ductility, % elongation of Examples VII through IX which are blends containing only one of either the paraffin, microcrystalline or HI wax, e.g., see the tensile strength, needle penetration and ductility, % elongation data.

EXAMPLE XII

The wax blend of Example X is formulated with the following exception:

2,6 ditert-butyl paracresol (0.05 wt. %) is added to the mixture. Substantially similar properties are exhibited when the above anti-oxidant is added to the blend.

EXAMPLE XIII

The Wax blend of Example XI is formulation with the following exception:

2,6 ditert-butyl paracresol (0.05 wt. %) is added to the mixture. The wax blend has substantially the same properties when the above-identified anti-oxidant is added to the blend.

EXAMPLE XIV

The wax blend of Examples X is fed to the coating head of an Ashdee Curtain Coating machine, manufactured by George Koch and Sons of Evansville, Ind., at a melt temperature of 240° F. A paper board is moved under and through a falling curtain of the molten wax blend at a rate of 800 feet per minute and the wax coating is allowed to congeal on the surface of the paper board. The congealed coating is clear, not tacky and, in addition, has excellent tensile strength and ductility, % elongation.

EXAMPLE XV

The procedure of Examples XIV is followed with the following exception:

The wax blend of Example XI was substituted for the wax blend of Example X, with substantially the same results occurring.

Obviously, many modifications and variations of the invention, as hereinbefore set forth, may be made without departing from the spirit and scope thereof, and therefore, only such limitations should be imposed as are indicated in the appended claims.

I claim:

1. A process for coating fibrous substrates with a wax composition which comprises:
   (a) forming a falling curtain of a viscous molten, thermoplastic wax composition,
   (b) causing a fibrous substrate to pass through said curtain of wax so as to deposit the wax on at least one surface of said fibrous substrate, and
   (c) permitting the wax to congeal on the surface of the fibrous substrate; the improvement which comprises employing as the falling curtain of wax, a composition which comprises:
   a mixture of (1) a paraffin wax having a melting point of from about 120° F. to about 160° F., (2) a petroleum wax selected from the group consisting of a recrystallized heavy intermediate wax having a melting point of from about 145° F. to about 185° F. and a microcrystalline wax having a melting point of from about 145° F. to about 200° F., and mixtures thereof, (3) a polymeric hydrocarbon compound having a molecular weight of from about 2,000 to about 100,000, (4) a hydrocarbon resin derived from a $C_5$ olefin petroleum feed stock or a polyterpene resin; and (5) optionally, but preferably, a petroleum-wax soluble, phenolic anti-oxidant.

2. A process for coating fibrous substrates with a wax composition which comprises:
   (a) forming a falling curtain of a viscous, molten thermoplastic wax composition,
   (b) causing a fibrous substrate to pass through said curtain of wax so as to deposit the curtain of wax on at least one surface of said fibrous substrate, and
   (c) permitting the wax to congeal on the surface of the fibrous substrate;
   the improvement which comprises employing as the falling curtain of wax, a wax composition which comprises:
   (1) from about 1 weight percent to about 80 weight percent of a fully refined paraffinic petroleum wax having a melting point range of from about 120° F. to about 160° F.
   (2) from about 1 weight percent to about 80 weight percent of a recrystallized heavy intermediate petroleum wax having a melting point range of from about 145° F. to about 185° F. and a clear color,
   (3) from about 1 weight percent to about 50 weight percent of a microcrystalline wax having a melting point of from about 150° F. to about 200° F.; and
   (4) from about 10 weight percent to about 30 weight percent of a polymeric hydrocarbon compound having a molecular weight of from about 2,000 to about 100,000 and a melt index of from about 1 to about 250 at 375° F.

3. The process according to claim 2 wherein the fully refined paraffinic petroleum wax of step (1) has a melting point range of from about 120° F. to about 150° F.

4. The process according to claim 2 wherein the recrystallized heavy intermediate petroleum wax of step (2) has a melting point range of from about 155° F. to about 170° F.

5. The process according to claim 2 wherein the microcrystalline wax of step (3) has a melting point range of from about 170° F. to about 190° F.

6. The process according to claim 2 wherein the polymeric hydrocarbon compound of step (4) is a member selected from the group consisting of ethylene-vinyl acetate copolymer, ethylene-ethyl acrylate copolymer and polypropylene and mixtures thereof.

7. The process according to claim 6 wherein the ethylene-vinyl acetate copolymer has a 15 weight percent to about 30 weight percent functional vinyl acetate content.

8. The process according to claim 6 wherein the ethylene-ethyl acrylate copolymer has a 20 weight percent to about 30 weight percent functional ethyl acrylate content.

9. The process according to claim 2 including adding from about 0.01 weight percent to about 15 weight percent of a hydrocarbon resin derived from a $C_5$ olefin petroleum feedstock or polyterpene resin to the wax composition.

10. The process according to claim 9 wherein the resin derived from a $C_5$ olsfin petroleum feedstock or polyterpene resin has a softening point of from about 180° F. to about 250° F.

11. The process according to claim 2 including adding from about 0.01 weight percent to about 0.2 weight percent of a petroleum-wax soluble, phenolic anti-oxidant to the wax composition.

12. The process according to claim 11 wherein the phenolic anti-oxidant is ditert-butyl paracresol.

13. The process according to claim 12 wherein the phenolic anti-oxidant is 2,6,ditert-butyl paracresol.

14. A process for producing a coated fibrous substrate having a wax coating on at least one side which comprises applying to at least one side of a fibrous substrate a film of a molten wax composition comprising: (a) from about 1 weight percent to about 80 weight percent of a fully refined paraffinic petroleum wax having a melting point range of from about 120° F. to about 160° F., (b) from about 1 weight percent to about 80 weight percent of a recrystallized heavy intermediate petroleum wax having a melting point range of from about 145° F. to about 185° F., (c) from about 1 weight percent to about 50 weight percent of a microcrystalline wax having a melting point range of from about 170° F. to about 190° F.; and (d) from about 10 weight percent to about 30 weight percent of a polymeric hydrocarbon compound having a molecular weight of from about 2,000 to about 100,000 and a melt index of from about 1 to about 250 at 375° F.

15. The process according to claim 14 wherein the fibrous substrate is a member selected from the group consisting of paper, corrugated paper board, paperboard cartons and paper cups and mixtures thereof.

16. The process according to claim 14 wherein the fully refined paraffinic petroleum wax has a melting point range of from about 120° F. and to about 150° F.

17. The process according to claim 14 wherein the recrystallized heavy intermediate petroleum wax has a melting point range of from about 155° F. to about 170° F.

18. The process according to claim 14 wherein the microcrystalline wax has a melting point range of from about 170° F. to about 190° F.

19. The process according to claim 14 wherein the polymeric hydrocarbon compound is a member selected from the group consisting of ethylene-vinyl acetate copolymer, ethylene-ethyl acrylate copolymer and polypropylene and mixtures thereof.

20. The process according to claim 14 wherein the ethylene vinyl acetate copolymer has a 15 weight percent to about 30 weight percent functional vinyl acetate content.

21. The process according to claim 14 wherein the ethylene-ethyl acrylate copolymer has a 20 weight percent to about 30 weight percent functional ethyl acrylate content.

22. The process according to claim 14 including adding to the wax composition from about 0.01 weight percent to about 15 weight percent of a hydrocarbon resin derived from a $C_5$ petroleum feedstock or polyterpene resin.

23. The process according to claim 22 wherein the resin derived from a $C_5$ olefin petroleum feedstock or polyterpene resin has a softening point of from about 180° F. to about 250° F.

24. The process according to claim 14 including adding to the wax composition from about 0.01 weight percent to about 0.1 weight percent of a petroleum-wax soluble, phenolic anti-oxidant.

25. The process according to claim 24 wherein the petroleum-wax soluble, phenolic anti-oxidant is ditert-butyl paracresol.

26. The process according to claim 25 wherein the phenolic anti-oxidant is 2,6,ditert-butyl paracresol.

* * * * *